(12) United States Patent
Merrill, Jr. et al.

(10) Patent No.: US 6,918,320 B2
(45) Date of Patent: Jul. 19, 2005

(54) CONDUIT SEAL PACKING TOOLS (75) Inventors: Benjamin E. Merrill, Jr., Magnolia Springs, AL (US); Billy Dale Wann, Elberta, AL (US)

(73) Assignee: Cooper Industries, Houston, TX (US)

( * ) Notice: Subject to any disclaimer, the term of this patent is extended or adjusted under 35 U.S.C. 154(b) by 0 days.

(21) Appl. No.: 10/300,133

(22) Filed: Nov. 20, 2002

(65) Prior Publication Data
US 2003/0094079 A1 May 22, 2003

Related U.S. Application Data (60) Provisional application No. 60/331,599, filed on Nov. 20, 2001, and provisional application No. 60/362,138, filed on Mar. 7, 2002.

(51) Int. Cl.[7] .............................................. B25B 33/00
(52) U.S. Cl. ................................ 81/8.1; 294/26; 7/170
(58) Field of Search ....................... 81/488, 8.1; 433/30, 433/31, 141, 146, 226, 3, 229; 223/113; 24/40; 600/247; 359/882; D24/139; D28/64.1, 64.3; 362/138; 294/26; 254/134.3 FT; 7/170; 29/267, 270, 278

(56) References Cited

U.S. PATENT DOCUMENTS

| | | | |
|---|---|---|---|
| 2,696,048 A | * 12/1954 | Lindgren | 433/162 |
| 3,162,191 A | * 12/1964 | Canan | 600/206 |
| 4,167,063 A | * 9/1979 | Sosnay | 433/3 |
| 4,640,978 A | 2/1987 | Kilbane et al. | 174/23 R |
| 4,886,454 A | * 12/1989 | Loewenthal et al. | 433/72 |
| 5,098,292 A | * 3/1992 | Lazarof | 433/141 |
| 5,718,583 A | 2/1998 | Flanagan | 433/141 |
| 2002/0014776 A1 | * 2/2002 | Boulay | 294/26 |

OTHER PUBLICATIONS

EU Search Report for App. No. PCT US 03/37276, (Apr. 21, 2004), 3 pages.

* cited by examiner

Primary Examiner—Debra S Meislin
(74) Attorney, Agent, or Firm—Schwegman, Lundberg, Woessner & Kluth, P.A.

(57) ABSTRACT

A packing tool or set of tools having a handle and one packing end that is formed to perform various tasks involved with packing fiber into conduits without damaging insulation on wires in the conduits. The tools are made of a non-conductive material that has a smooth surface on the packing end or ends with no sharp edges. In one embodiment the tools are made of injection molded plastic and are lightweight. One tool has a hook for picking up a single wire on one end, and a larger hook on the other end for picking up multiple wires. A further tool has a first end for packing and a second end with a mirror that is angled to facilitate inspection of the packing.

7 Claims, 10 Drawing Sheets

CONDUIT SEAL PACKING TOOLS

This application claims benefit of provision of Ser. No. 60/331,599 filed Nov. 20, 2001 and claims benefit of provision Ser. No. 60/362,138 filed Mar. 7, 2002.

FIELD OF THE INVENTION

The present invention relates to tools for packing conduit seals, and in particular to tools designed specifically for such packing.

BACKGROUND OF THE INVENTION

Figure 1:
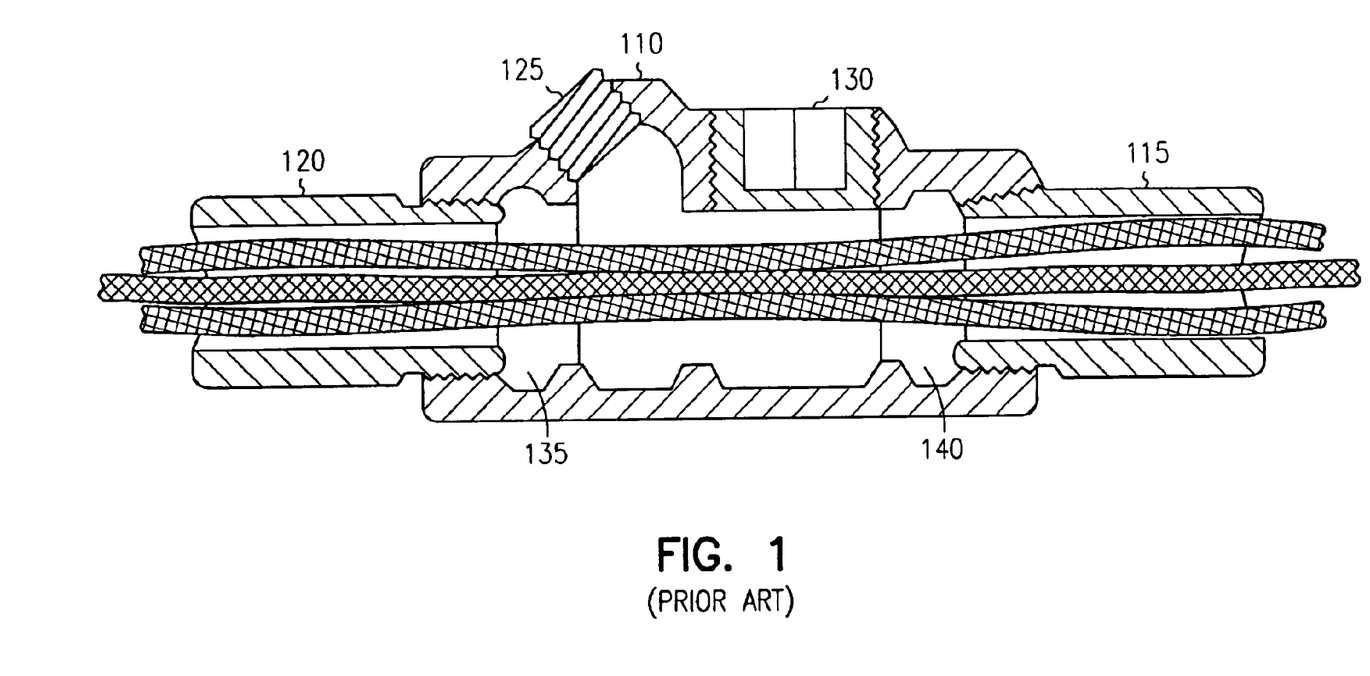
FIG. 1 is a prior art cross section of two conduits joined by a horizontal fitting.
Figure 2:
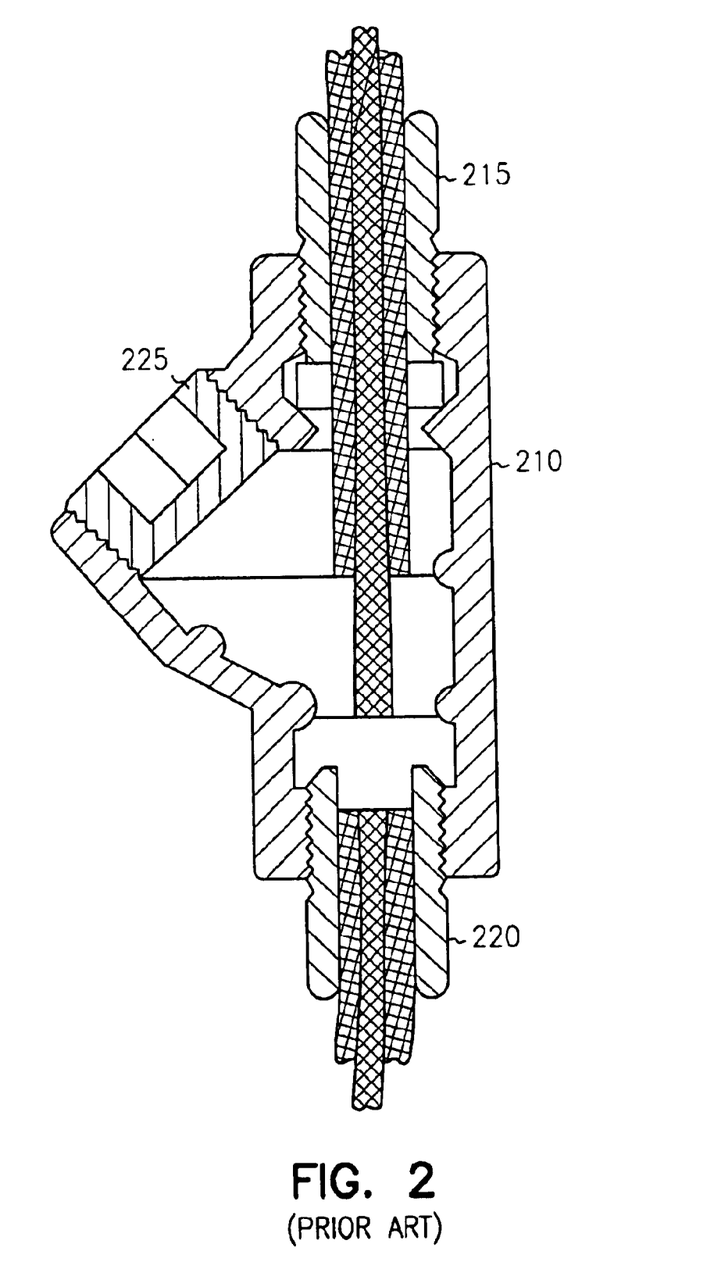
FIG. 2 is a prior art cross section of two conduits joined by a vertical fitting.

When electrical conduits are joined in hazardous locations, they should be sealed to prevent gas from traveling between the joined conduits. There may be several insulated electrical wires in the conduits, and a packing material is used to seal the wires in the conduits. Two examples of joined conduits are illustrated in Prior Art FIGS. 1 and 2. FIG. 1 shows a horizontal fitting 110 for joining two horizontally disposed conduits, 115 and 120 via mating sets of threads. Multiple wires are disposed within the conduits. Two plugs 125 and 130 provide access to fitting 110. Plug 130 provides access to pack each of the conduits with fiber at 135 and 140. Plug 125 provides access for adding a compound between the fiber plugs. It is desired that when packed, a dam is created, and none of the wires are touching either themselves, or sides of the seals. FIG. 2 shows a vertical fitting 210 connecting two vertically disposed conduits 215 and 220. A single plug 225 provides access to pack conduit 220 which is below conduit 215 to create a single dam having similar characteristics.

Prior methods of packing the seals involved the use of various ad lib tools, such as pencils, screw drivers, welding rods, and whatever else might provide some access through the plug or plugs to form the fiber dams. There is a need for a tool or set of tools that provides easy access through the various plugs for packing fiber in conduit seals to create dams. There is a further need for such tools that don't damage insulation on wires in the conduits. There is yet a further need for such tools that provide the ability to pack the fibers in a solid homogenous pack.

SUMMARY OF THE INVENTION

A packing tool or set of tools have a handle, and at least one packing end that is formed to perform various tasks involved with packing fiber into conduit seals without damaging insulation on wires in the conduits. The tools are made of a non-conductive material that has a smooth surface on the packing end or ends with no sharp edges. In one embodiment the tools are made of injection molded plastic and are lightweight.

One such tool has a first packing end that is formed at approximately a 90 degree angle from the handle and is generally cylindrical in shape, ending in a substantially flat or slightly convex surface. The diameter of the first packing end allows insertion through a plug in a fitting between the conduits. The first packing end fits between and over the tops of wires within the conduits. A second end of the tool has a similar cylidrically shaped form, and is angled at approximately 37 degrees from the handle to provide easier access for vertically oriented conduits. Other angles may also be provided.

A second tool is similar to the first tool, but has heavier, larger sized heads on the packing ends. The tips are in the shape of a ball in one embodiment, or a cone with rounded edge to provide a larger surface area for packing in larger conduits.

A third tool has handle with a hook for picking up a single wire on one end, and a larger hook on the other end for picking up multiple wires. A forth tool has first end for packing similar to that of the first tool, and a second end with a mirror that is angled to facilitate inspection of the packing. A fifth tool has at least one angled end with an even further enlarged head for heavier packing tasks.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figures 3A, 3B, 3C:
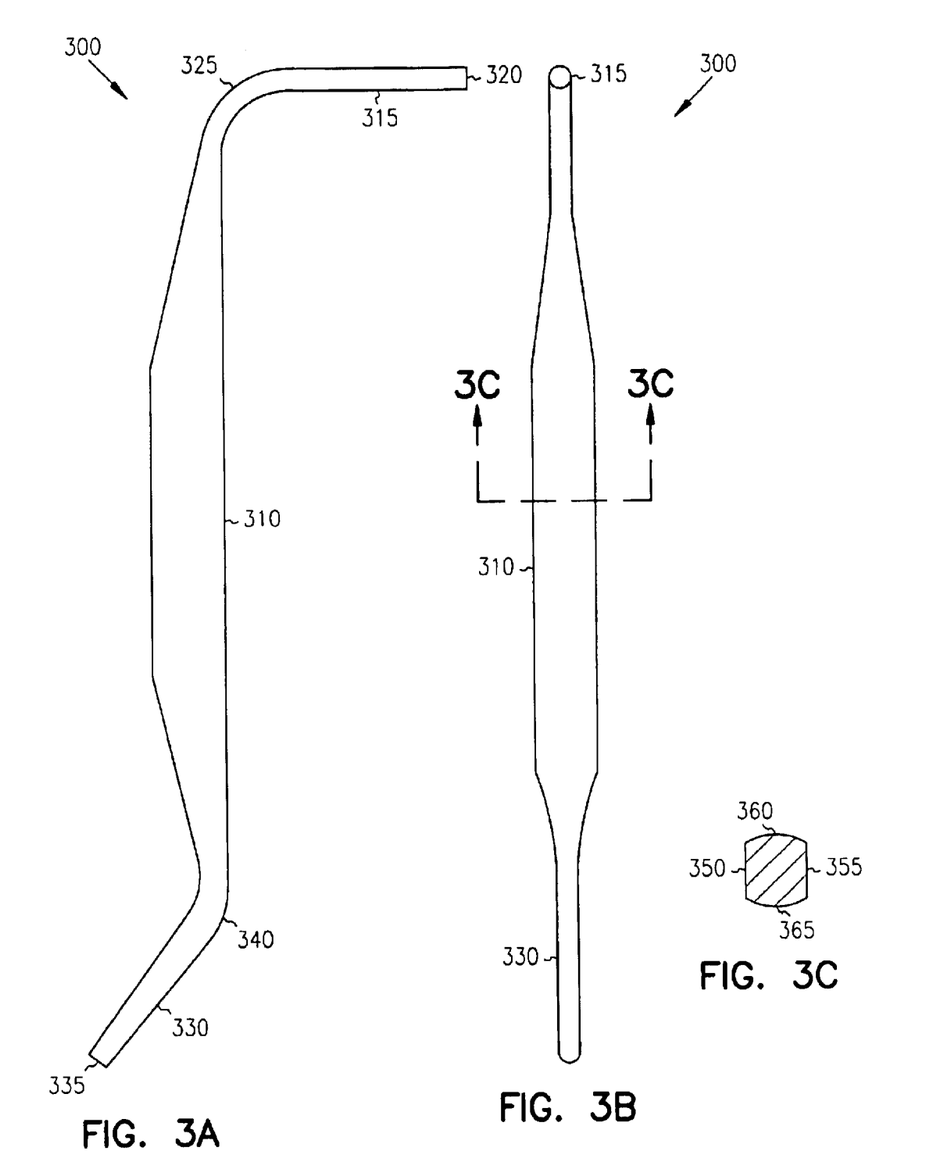
FIGS. 3A, 3B and 3C are views of a tool for packing fibers in joined conduit seals.

A first tool 300 for packing wadding, such as fibers into a conduit is illustrated in a plan view in FIG. 3A and side view in FIG. 3B. Typical conduits joined by a fitting are shown in FIGS. 1 and 2 and described in the background section herein. Tool 300 is used for packing the fibers into a portion of the conduit at a point where it joins with the fitting by use of mating threaded portions. The packed fiber may be mostly in the conduit, or partially in the conduit and a hub of the fitting where the conduit attaches to the fitting, creating a seal. Tool 300 has a handle 310 for conveniently gripping, and a first packing end 315 having a packing head or tip 320. In one embodiment, the first packing end has a circular cross section, buy may also be other shapes. It is smooth with minimal sharp edges that can damage insulation on wires in the conduits during use such that even those unskilled may use the tool without damaging the wires. In alternative embodiments, tip 320 is planar, or slightly convex. The first packing end is fairly straight in one embodiment, and curves away from handle 310 at approximately 90 degrees. The angle may vary as desired, and is convenient for packing fibers through an access hole that is perpendicular to the fitting as shown at plug 130 on a horizontal fitting of FIG. 1. The 90 degree angle of the first end to the handle allows packing in both conduits through the access hole corresponding to plug 130.

A second packing end 330 has a tip 335, and extends at approximately a 37 degree angle from handle 310 as indicated at 340. The angle is substantially less than 90 degrees to provide an ability to pack different portions of the conduit seal. The angle may vary dependent on the size of the conduit and size of openings for the tool. Packing end 330 has an approximately circular cross section similar to that of the first packing end 315. The tip of the packing end 340 is also either flat or convex, similar to tip 320.

FIG. 3C is a cross section of the handle. It is generally rectangular in shape in one embodiment, with opposed flat sides 350, 355 that are approximately co-planar with the packing ends, and opposed convex sides 360, 365 for the other sides of the rectangular shape. Other shapes and side structures may also be used as desired. The opposed flat sides 350, 355 provide a keying mechanism in one embodiment so the user knows the orientation of the tool 300.

Some typical dimensions for tool 300 are dependent on the sizes of the conduits and fittings. For 0.75 inches and 1 inch conduits, packing end 315 is approximately 2.562 inches in length, with the tips 320 and 335 having a diameter of approximately 1.87. The total length of the tool is approximately 8.25 inches with typical handle dimensions of 0.625 and 0.5 inches for the opposed convex and flat sides respectively. In one embodiment, the tools are formed of non-conductive injection molded plastic or other polymer such a Plexiglas® or nylon. The packing ends of the tools have dimensions that enable it to be somewhat flexible during use.

In one embodiment, the fiber is a mineral fiber, such as Chico X® sealing compound provided by Crouse-Hinds. The fittings comprise hubs where the sealing compound is packed, and the sealing compound may be ordered by specifying the fitting to be sealed. Hub sizes range from ½ inch to 6 inches, with the amount of compound varying from 1/32 ounces to 8 and ¼ ounces respectively. In use, the fiber is first packed behind the conductors. The conductors are forced away from the hub opening and forced apart. The fiber is then packed between and around conductors in the hub. Temporary wooden wedges are sometimes used between conductors to hold them apart so that sealing compound surrounds each conductor.

Figure 4A:
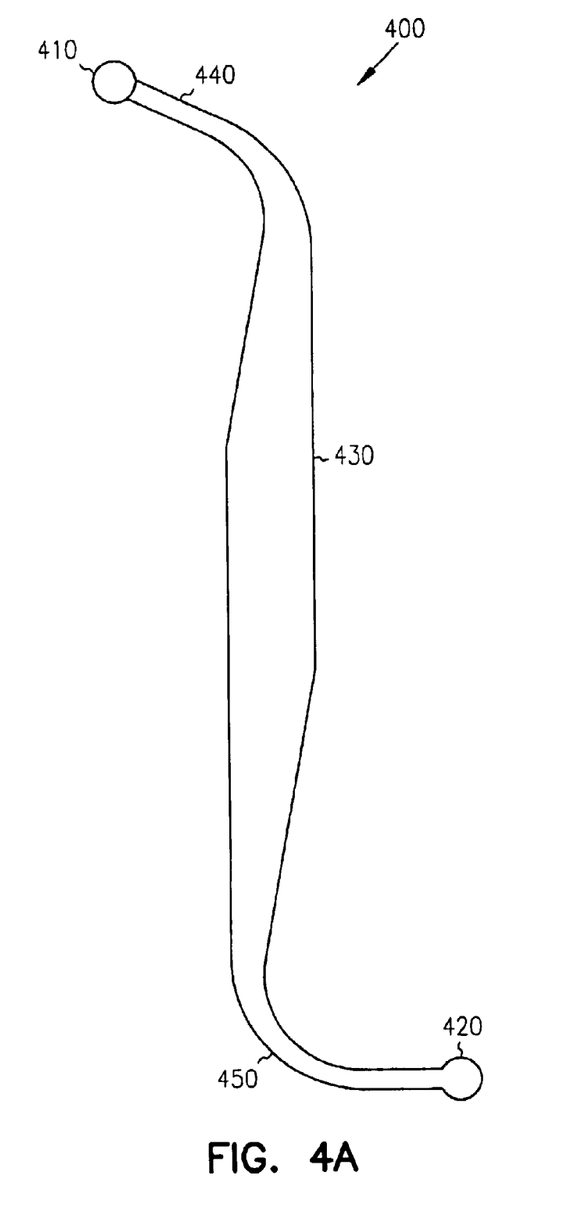
FIGS. 4A and 4B are views of a further tool for packing fibers in joined conduit seals.
Figure 4B:
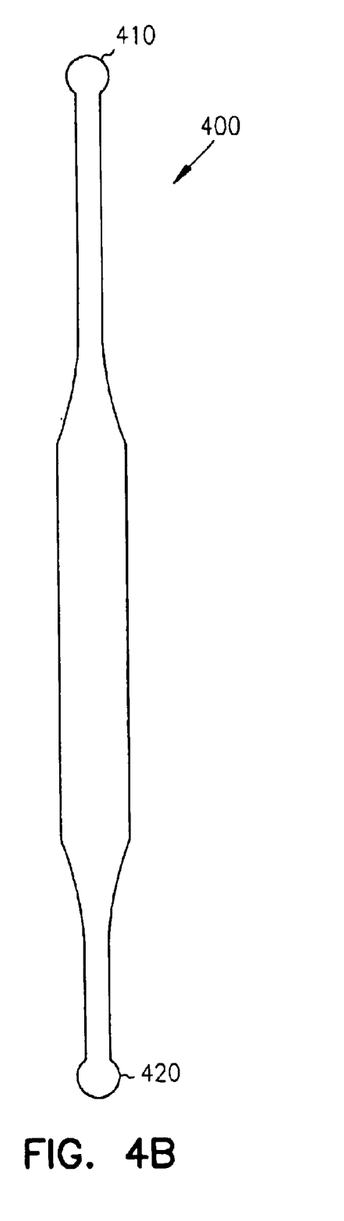

FIGS. 4A and 4C show a second packing tool generally at 400. The relative size of tool 400 is approximately the same as that of the first tool, however, the second tool 400 has larger tips 410 and 420. The larger tips are in the form of a ball in one embodiment, but may also be other shapes, such as a flared cone or other type of structure that provides a larger surface area for packing fiber in larger areas. Further, many embodiment of the tip do not have sharp edges, to minimize the potential for damaging wire insulation. The second packing tool 400 includes a handle 430, a first packing end 440 and a second packing end 450. The first packing end curves away from the handle at a 25 degree angle, while the second packing end curves away in an opposite direction from the first packing end at an angle of about 90 degrees with a radius of curvature of approximately 0.75 inches. The cross sections of the packing ends is approximately circular in one embodiment, but may be varied as desired.

Packing tool 400 is generally useful in packing larger radius conduit, and in packing in the middle of a group of wires in the conduit.

Figure 5A:
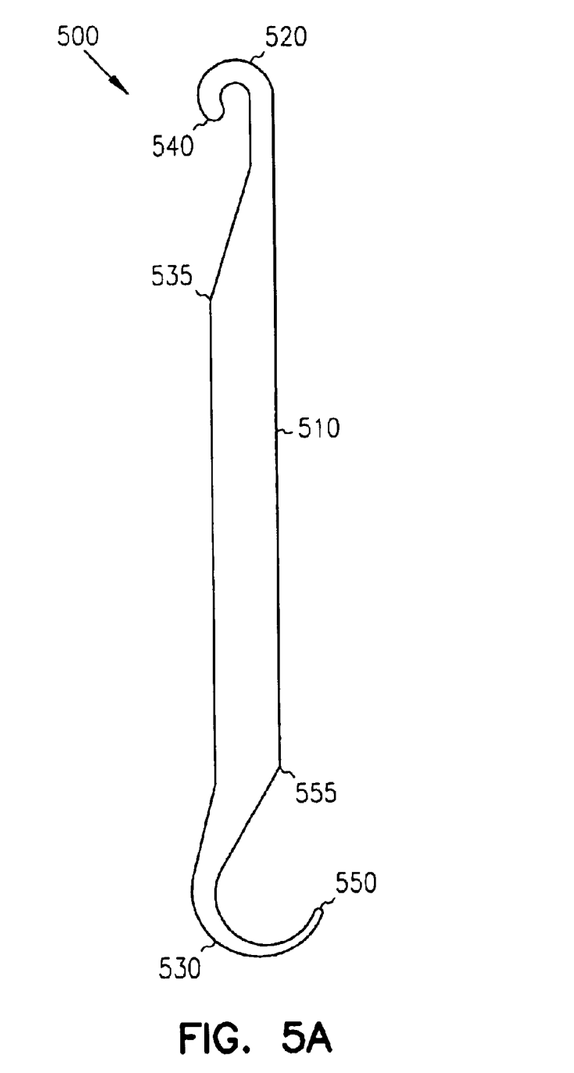
FIGS. 5A and 5B are views of a further tool for packing fibers in joined conduit seals.
Figure 5B:
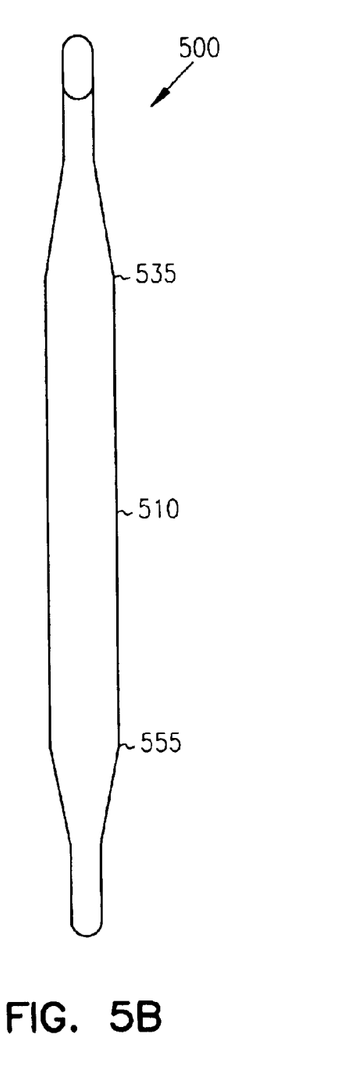

FIGS. 5A and 5B show different views of a third tool 500, which is used to perform lifting functions. It also comprises a handle 510, referred to as a lifting tool. Each end of the tool comprises a different hook portion 520 and 530. Hook portion 520 is shaped in the form of a semicircle, resembling a hook with a diameter of approximately 0.562 inches. This hook portion 520 is formed to facilitate picking up a single wire in the conduit, and is used in conjunction with the first and second tools to hold or move wires for packing the conduit/fitting with fibers. Hook portion 520 is approximately 0.187 inches in diameter in one embodiment. The tool handle 510 is approximately 0.5 inches in diameter, and begins an approximately 15 degree single taper toward hook portion 520 at 535. A tip 540 of hook portion 520 is rounded in one embodiment to minimize insulation damage during use.

Second hook portion 530 is larger, and is used to lift several if not all of the wires in the conduit to allow packing of fiber by other tools under the wires. Hook portion 530 has a diameter of curvature of approximately 1 inch, and tapers to a smaller rounded tip, 550. A single taper also begins a distance up the handle 510 from hook portion 530 at an approximately 30 degree angle as indicated at 555. As seen in the side view of FIG. 5B, both sides of the handle taper as opposed to a single side from the front view of FIG. 5A. The angle of tapers at 535 is approximately 8 degrees, while the angle of tapers at 555 is approximately 10 degrees. In one embodiment, the tapers are formed such that a center of radius of curvature of the hooks is approximately co-radial with the center of the handle. With respect to hook portion 530, the side of the handle opposite the inward taper portion starting at 555 extends out away from the handle to achieve such co-radial structure.

Figures 6A, 6B:
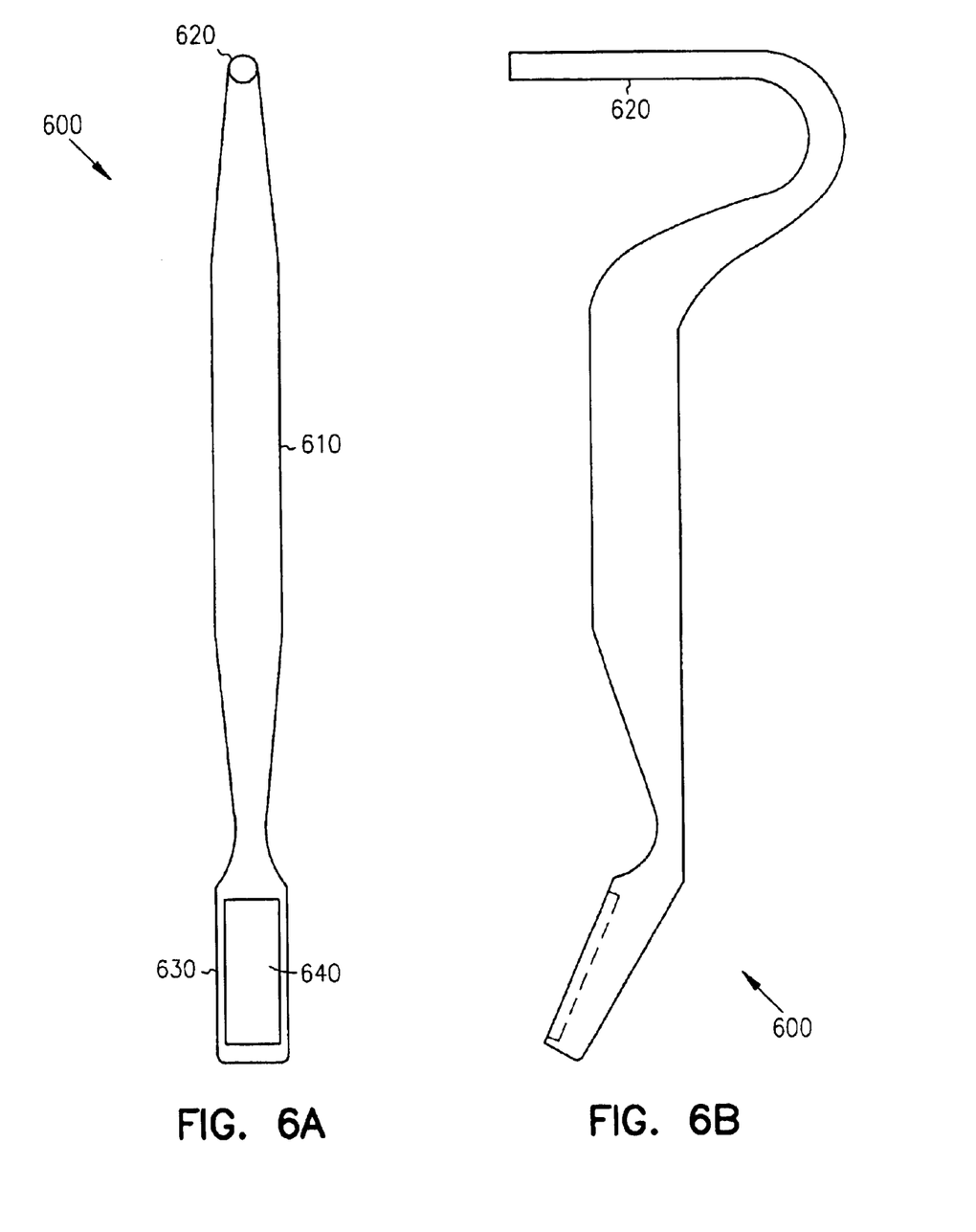
FIGS. 6A and 6B are views of a tool for packing and inspecting fibers in joined conduit seals.

FIG. 6A is a front view of a fourth tool 600, having a similar handle 610 and pairs of 6 degree tapers to a first end 620 and a second end 630. First end 620 comprises a packing end similar to the first end 315 of the first tool 300. The second end 630 has a rectangular mirror 640, and is shaped to fit into the fitting to inspect the dam of fibers and assist in the packing of the fibers. At the end of the taper toward the second end, the handle curves to the mirror portion of the second end. Also, as seen in side view 6B, the mirror portion 630 is angled at approximately 30 degrees from the handle. In one embodiment, the mirror portion is approximately 1.125 inches in length and approximately 0.432 inches in width. Other dimensions and shapes of mirrors may also be utilized. The mirror is recessed in the end in one embodiment, and is shatter proof. In one embodiment, the second end of the fourth tool 600 with recessed mirror, tapers from the handle end to the tip.

Figure 7A:
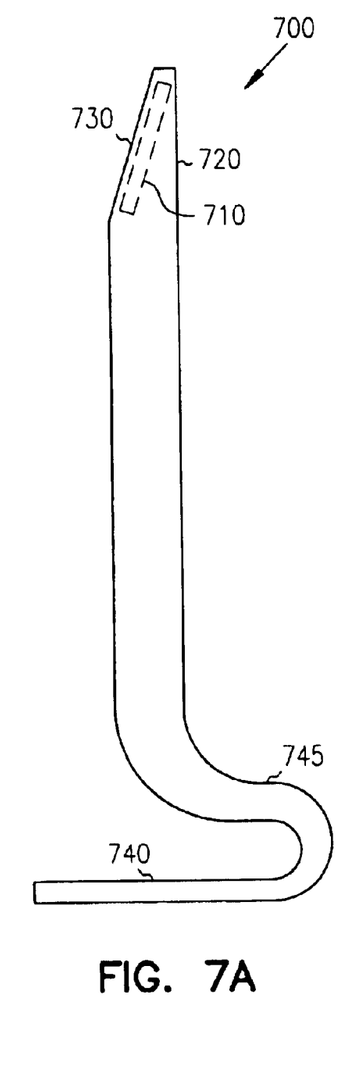
FIGS. 7A and 7B are views of an alternative tool for packing and inspecting fibers in joined conduit seals.
Figure 7B:
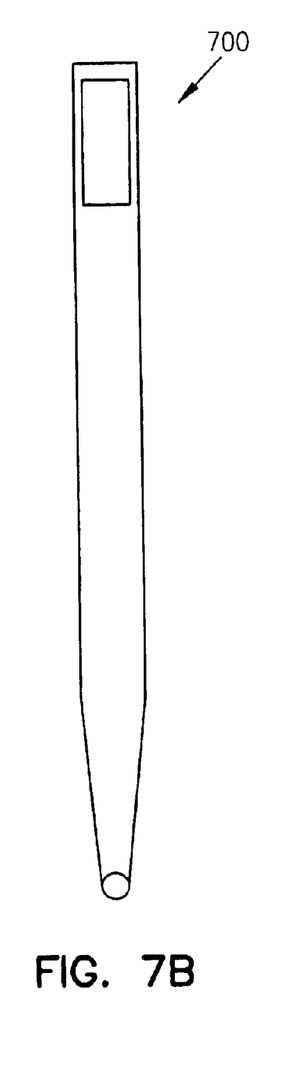

FIGS. 7A and 7B show an alternative fourth tool 700, with a mirror 710 recessed in a mirror end of the tool. One side 720 of the mirror end of the tool comprises a portion extending straight from the handle, while a second side 730 containing the recessed mirror angles away from the handle at approximately 12 degrees. A second end of the alternative fourth tool comprises a portion 740 that is a substantially straight rod at a 90 degree angle from the handle of the tool. The second end of the fourth tool also comprises a portion that extends oppositely from the portion 740 away from the handle, then curves back into the portion 740. Thus, the portion 740 is offset in one direction from the handle, and extends oppositely from such offset direction. In one embodiment, if the handle were continued, it would intersect about the middle of the portion 740 used for packing fibers into the conduit seal. When viewed from the side as in FIG. 7B, there is no visible taper toward the mirror 730 end, while there is a dual taper of approximately 6 degrees toward the second end.

Figure 8A:
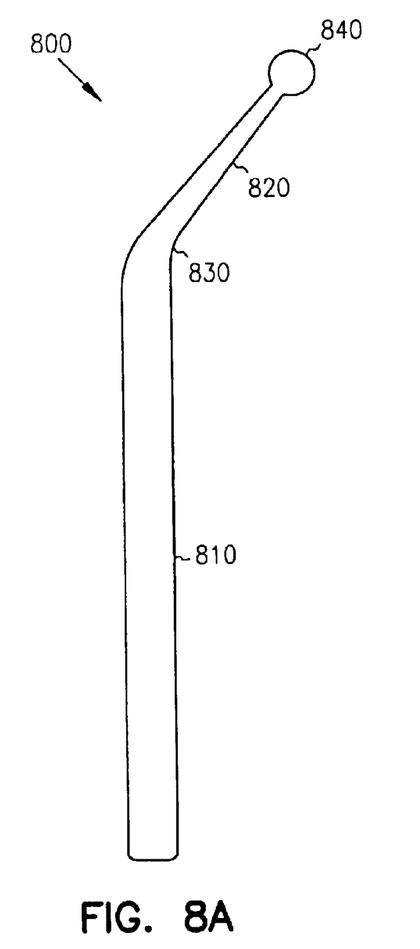
FIGS. 8A and 8B are views of a further tool for packing fibers in joined conduit seals.
Figure 8B:
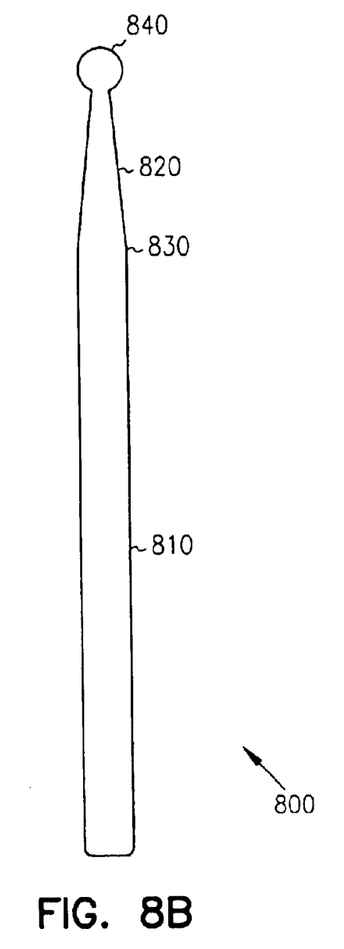

A fifth tool is shown generally at 800 in FIGS. 8A and 8B. This tool has a handle 810, and a packing end 820 extending at an angle of approximately 40 degrees starting at 830. The packing end 820 ends at a tip 840, which is ball shaped in one embodiment with a diameter of approximately 0.5 inches. This is a larger diameter than other tools, and the size may be varied to facilitate packing of larger conduit seals, such as 4 inch fittings. The handle is 0.5 by 0.625, again with one pair of opposite sides flat, and the other convex.

Figure 9:
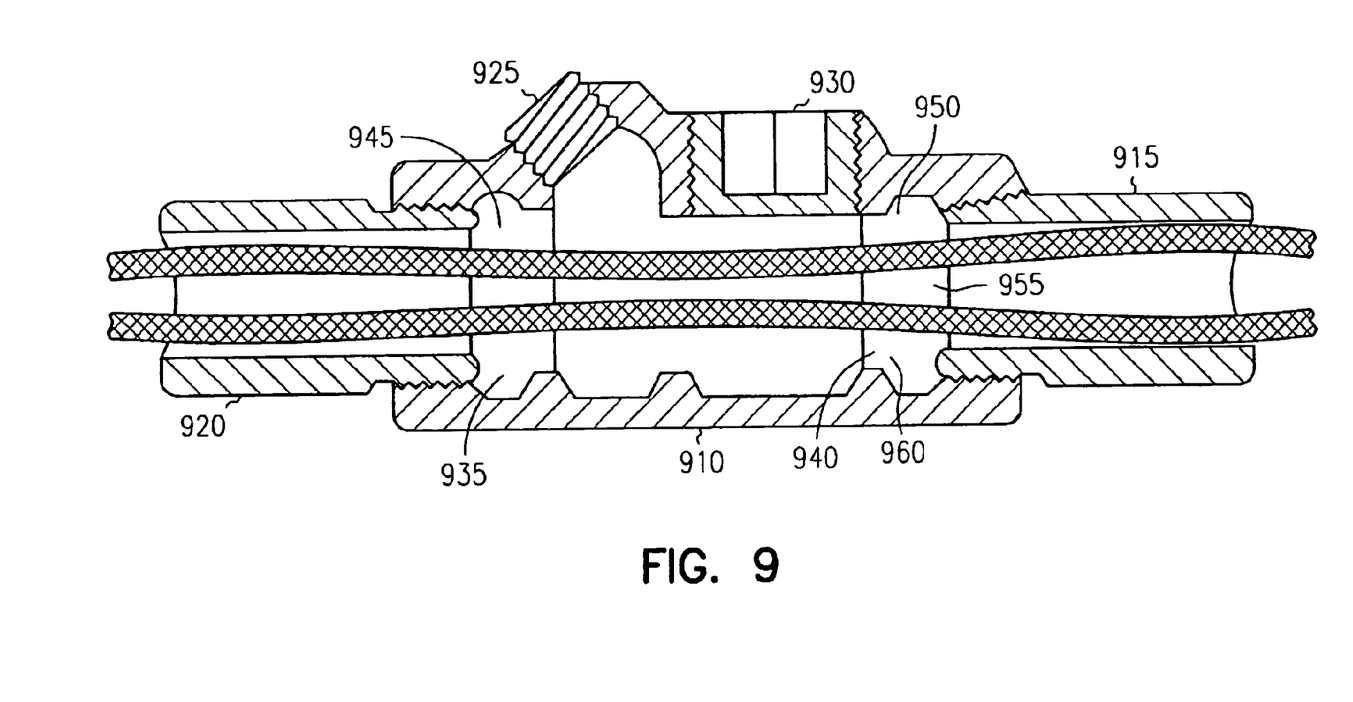
FIG. 9 is a cross section of a horizontal conduit and fitting combination identifying locations for using various tools to pack fibers around wires in the conduit seal.
Figure 10:
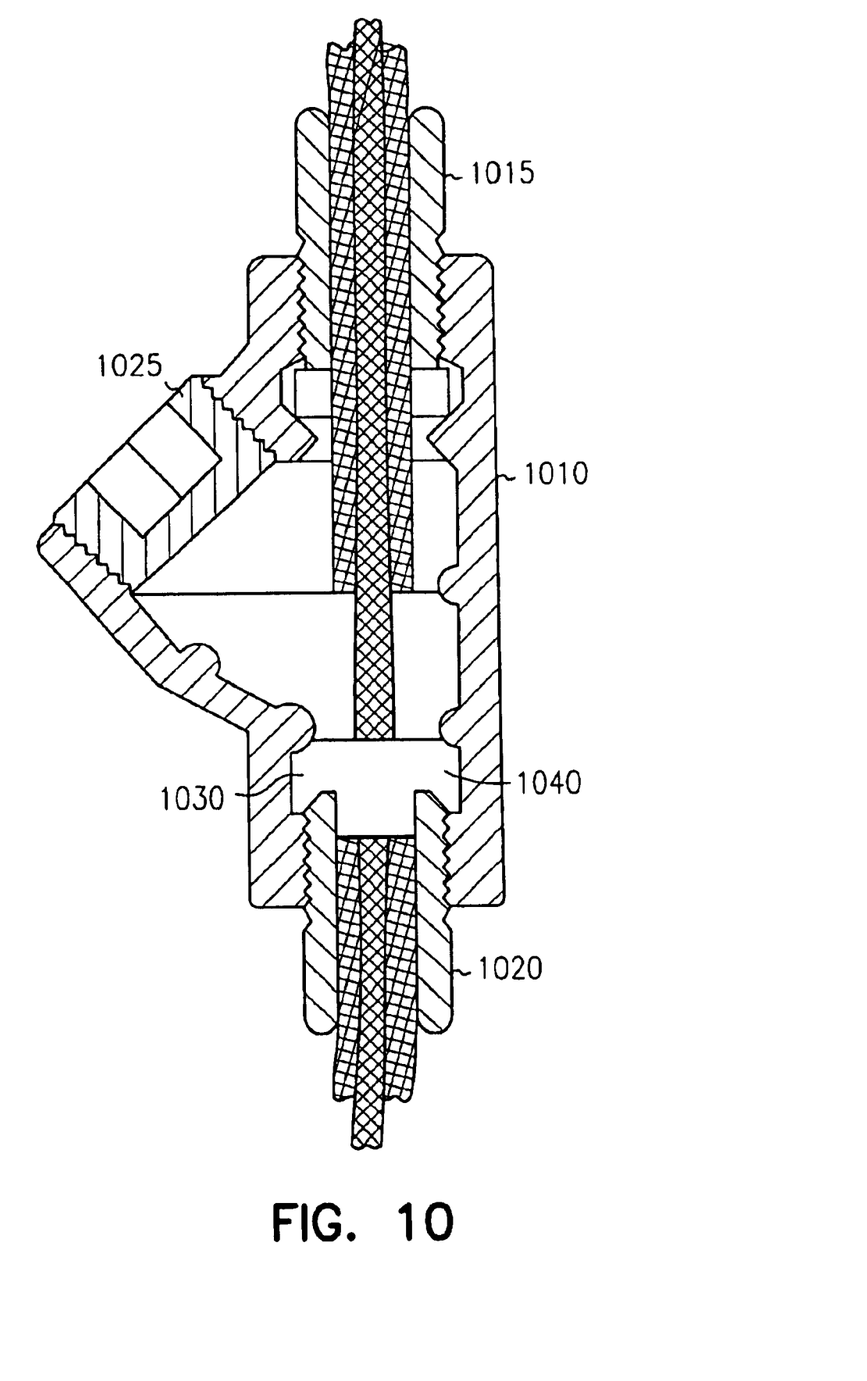
FIG. 10 is a cross section of a vertical conduit and fitting combination identifying locations for using various tools to pack fibers around wires in the conduit seal.

FIGS. 9 and 10 show cross sections of conduit and fitting combinations, with locations identifying areas where the previously described tools may be used. Each tool may be used in many different areas beyond those identified, and such areas may be determined by individual users of the tools.

FIG. 9 shows a horizontal fitting 910 for joining two horizontally disposed conduits, 915 and 920 via mating sets of threads. Multiple wires are disposed within the conduits. Two plugs 925 and 930 are provided in the fitting 910. Plug 930 allows access to the fitting when removed to pack each of the conduit seals with fiber at 935 and 940. Plug 925 allows access to add a compound between the fiber plugs. It is desired that when packed, a dam is created, and none of the wires are touching either themselves, or sides of the conduits. The first packing end 315 of first tool 300 is used to pack fibers in the top end of the conduit seals as indicated at 945 and 950. The top end is closest to openings normally plugged by plugs 925 and 930. The second end 330 of first tool 300 is used to pack fibers between the wires as indicated at 955 and below the wires as indicated at 960 as is end 440 of second tool 400.

FIG. 10 shows a vertical fitting 1010 connecting two vertically disposed conduits 1015 and 1020. A single plug 1025 provides access to pack a seal for conduit 1020, which is below conduit 1015, creating a single dam. The second end 330 of first tool 300 is used to pack fibers 1040 opposite the single plug 1025 as in the horizontally disposed conduits. The second packing end 450 of second tool 400 is used to pack fibers for the seal of conduit 1020 as indicated at 1030. End 440 of tool 400 is used to pack fibers at 1040 opposite the single plug 1025.

What is claimed is:

1. A tool for use in packing material in a combination of a fitting coupling electrical conduits, the tool comprising:
   a handle;
   a first end of the handle;
   a mirror recessed in the first end of the handle and angled with respect to an axis of the handle, wherein the tool is formed of a flexible material and lack of sharp edges to minimize damage to wires within a conduit and fitting;
   a second end of the handle, wherein the second end comprises a first portion extending in a first direction away from the handle, and a second portion extending back, opposite the direction of the first direction to form a packing end that is substantially straight and extending on both sides of the handle.

2. The tool of claim 1 wherein the first end of the handle is tapered to a smaller cross section at its end opposite the handle.

3. The tool of claim 1, wherein the tool is formed of a polyethelene glass material.

4. The tool of claim 1 wherein the mirror is shatter proof.

5. A method of using a set of tools for packing material in a combination of a fitting coupling electrical conduits, the method comprising:
   using a first tool to pack material in one end of the fitting, wherein the tool has a handle and a packing end on a first end of the handle and the tool is formed of a flexible material and lack of sharp edges to minimize damage to wires and wherein an angle between the handle and first end facilitates insertion and packing of material in selected locations within a conduit and fitting; and
   using a second tool for manipulating wires in the fitting, wherein the second tool has a handle with a first end having a hook sized to pick up a single wire in a conduit and a second end having a hook sized to pick up multiple wires in a conduit, wherein the ends of the tool are formed of a flexible material and lack of sharp edges to minimize damage to wires within the fitting and conduit.

6. The method of claim 5 and further comprising:
   using a third tool to view the packing material in the fitting, wherein the first tool has a handle and a mirror recessed in a first end of the handle and angled with respect to an axis of the handle, wherein the tool is formed of a flexible material and lack of sharp edges to minimize damage to wires within a conduit and fitting.

7. The method of claim 5 and further comprising using a second end of one of the tools having larger packing end than the first end of the first tool to facilitate packing of larger fittings.

\* \* \* \* \*